(12) United States Patent
Shelor

(10) Patent No.: US 7,130,988 B2
(45) Date of Patent: Oct. 31, 2006

(54) STATUS REGISTER UPDATE LOGIC OPTIMIZATION

(75) Inventor: Charles F. Shelor, Arlington, TX (US)

(73) Assignee: Via-Cyrix, Inc., Fremont, CA (US)

(*) Notice: Subject to any disclaimer, the term of this patent is extended or adjusted under 35 U.S.C. 154(b) by 623 days.

(21) Appl. No.: 10/294,577

(22) Filed: Nov. 15, 2002

(65) Prior Publication Data
US 2004/0098564 A1    May 20, 2004

(51) Int. Cl.
*G06F 9/38* (2006.01)
*G06F 9/00* (2006.01)

(52) U.S. Cl. ...................... 712/208; 712/219
(58) Field of Classification Search ............... 712/208, 712/219
See application file for complete search history.

(56) References Cited

U.S. PATENT DOCUMENTS

| | | | | |
|---|---|---|---|---|
| 5,222,240 A | * | 6/1993 | Patel | ........................... 712/218 |
| 5,751,985 A | * | 5/1998 | Shen et al. | ................... 712/218 |
| 5,815,698 A | * | 9/1998 | Holmann et al. | ........... 712/237 |
| 6,304,955 B1 | | 10/2001 | Arora | |
| 2002/0069348 A1 | | 6/2002 | Roth et al. | |

OTHER PUBLICATIONS

Massey "Pipeline Hazards" pp. 1-6—http://cs-alb-pc3.massey.ac.nz/notes/59304/113.html.

* cited by examiner

*Primary Examiner*—Henry W. H. Tsai
(74) *Attorney, Agent, or Firm*—Finnegan, Henderson, Farabow, Garrett & Dunner, LLP

(57) ABSTRACT

A system and method for handling a status change in a pipeline microprocessor. The pipeline microprocessor determines, at the decode unit, if an instruction is a status instruction. If the instruction is determined to be a status instruction, the decode unit delays the start of the following instruction a sufficient number of clock cycles to allow the status change to propagate through the system pipeline.

10 Claims, 4 Drawing Sheets

STATUS REGISTER UPDATE LOGIC OPTIMIZATION

FIELD OF THE INVENTION

The present invention relates to the field of microprocessors and more particularly to updating the status register and optimizing logic.

BACKGROUND OF THE INVENTION

Pipeline processing is a method of processing information. A pipeline consists of several units that perform tasks on information. After a first unit has completed its work on the information, the information is passed to another unit. The work done on the information by the pipeline is not completed until it has passed through all the units in the pipeline.

The advantage of pipelining is that it increases the amount of processing per unit time. This results in instructions being handled in less cycles.

In FIG. 1, an exemplary diagram of a Microprocessor 100 using pipeline processing is shown. The Microprocessor 100 comprises an Instruction Fetch Unit 110 communicatively connected to a Decode Unit 115 and an Instruction Cache Unit (IC) 135. The Decode Unit 115 is communicatively connected to an Execute Unit 120. The Execute Unit 120 is communicatively connected to a Memory Access Unit 125. The Memory Access Unit 125 is communicatively connected to a Register Writeback Unit 130 and a Memory 140. The Register File 105 is communicatively connected to the Instruction Fetch Unit 110, Decode Unit 115, Execute Unit 120, and the Register Writeback Unit 130. In an exemplary embodiment, the Register Writeback Unit 130, however, is only capable of sending signals to the Register File 105, it is incapable of receiving signals from the Register File 105.

The Microprocessor 100 in FIG. 1 receives an instruction sequence, for example instruction n to instruction n+9, as inputs. The Instruction Fetch Unit 110 requests and grabs the instructions from the IC 135. The IC 135 obtains instructions from the main processor memory and stores them locally. The IC 135 serves to reduce the amount of time the Instruction Fetch Unit 110 takes to obtain an instruction. By having the instructions available at the IC 135, the Instruction Fetch Unit 110 does not have to spend additional cycles waiting for an instruction to arrive from the main memory.

When the Instruction Fetch Unit 110 grabs an instruction, it also requests another instruction. Requesting an instruction before it is needed is known as prefetching. By requesting that the IC 135 prefetch an instruction, the Instruction Fetch Unit 110 can further reduce the amount of time it has to wait to receive an instruction. When the Instruction Fetch Unit 110 returns to the IC 135 in order to grab the instruction it previously requested, it will either receive the instruction or have to wait for the IC 135 to obtain the instruction.

Whenever a requested instruction is not immediately available to the Instruction Fetch Unit 110, the IC 135 sends a wait signal to the Instruction Fetch Unit 110. This indicates to the Instruction Fetch Unit 110 that it needs to wait to receive the request and to wait before making any additional prefetch requests.

When an Instruction Fetch Unit 110 receives instruction n from the IC 135, it next requests instruction n+1. At the next clock cycle, if a wait has not been received from the IC 135, instruction n+2 is requested by the Instruction Fetch Unit 110. The Instruction Fetch Unit 110 receives instruction n+1 and the Decode Unit 115 receives instruction n. This process will continue throughout the Microprocessor 100 until instruction n has passed through each unit and a result is written back to the Register File 105.

Although the pipeline process increases the speed in which groups of instructions are processed, it has difficulty handling instructions that are dependent on the results from a preceding status instruction. A status instruction is an instruction that causes a change in the status of the system, such as whether the interrupts are on or off or a change from user mode to system mode. Once a status instruction has changed the status of the process, the Register File 105 will return an incorrect result if queried for a result during the status change.

Results from instructions are written to the Register File 105. Therefore, whenever an instruction requires a result from a previous instruction, it searches the Register File 105 for the result. One problem that occurs is that in some cases the result has not been written to the Register File 105. For example, if at the Execute Unit 120 a new result is computed, it has to propagate through the Memory Access Unit 125 and the Register Writeback Unit 130 before it is written to the Register File 105. A similar problem can occur with a status change of the system. If the status of the system has changed, due to a status instruction, accesses to resources that depend on the current processor status will return incorrect results until the new status has propagated through the processor pipeline.

One method for resolving these problems is data forwarding. Data forwarding, as its name implies, forwards data or results from a first instruction to a second, or dependent, instruction that is waiting for the result. Through data forwarding, the dependent instruction may proceed through the pipeline without errors or delays. Data forwarding allows the status of the system to be forwarded to the dependent instruction. The requesting instruction would then be able to obtain the correct information.

The problem with data forwarding, however, is that it requires additional hardware to implement. This results in a larger chip that consumes additional power. In addition, in many instances the data forwarding would have to be setup along a critical path. That would affect the overall speed of the system.

The present invention is directed to overcoming one or more problems presented above.

SUMMARY OF THE INVENTION

In accordance with the embodiments of the invention, as embodied and broadly described herein, the invention comprises a system for optimizing pipeline microprocessor logic for status register updates comprising: a storage unit for storing instructions; a register file; a fetch unit for fetching an instruction from the storage unit and communicating with the register file; and a decode unit for decoding the instruction from the fetch unit; wherein upon detection of a status instruction, the decode unit delays the status instruction completion for a predetermined period of time.

In accordance with a second embodiment of the invention, as embodied and broadly described herein, the invention comprises a method of optimizing pipeline microprocessor logic for status register updates comprising: receiving a status instruction at a decode unit; assigning additional clock cycles at the decode unit to the end of the status instruction; delaying the instruction following the status instruction until the additional clock cycles have terminated; and allowing the status change to propagate through the processor pipeline.

It is to be understood that both the foregoing general description and the following detailed description are exemplary and explanatory only and are not restrictive of the invention, as claimed.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

The accompanying drawings, which are incorporated in and constitute a part of this specification, illustrate several embodiments of the invention and together with the description, serve to explain the principles of the invention.

DESCRIPTION OF THE PREFERRED EMBODIMENTS

Figure 1:
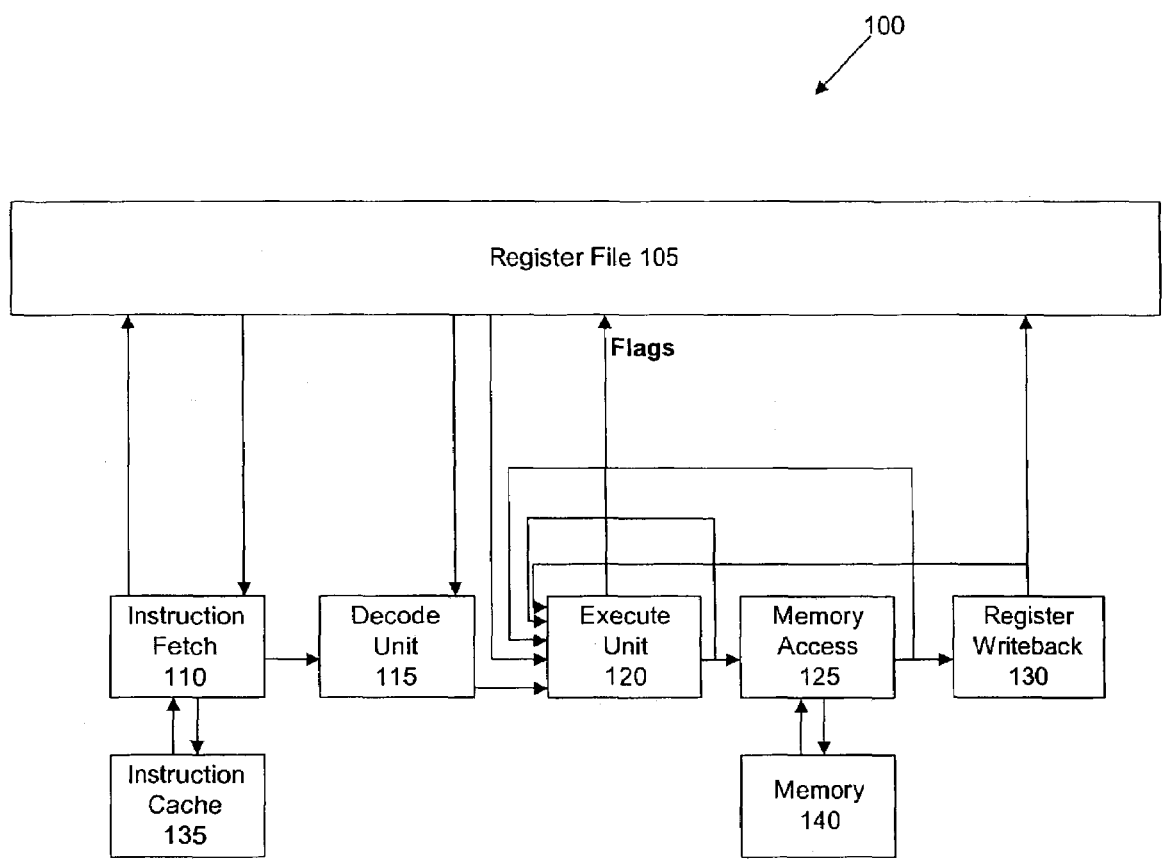
FIG. 1 is a diagram of a prior art microprocessor using pipeline processing.
Figure 2:
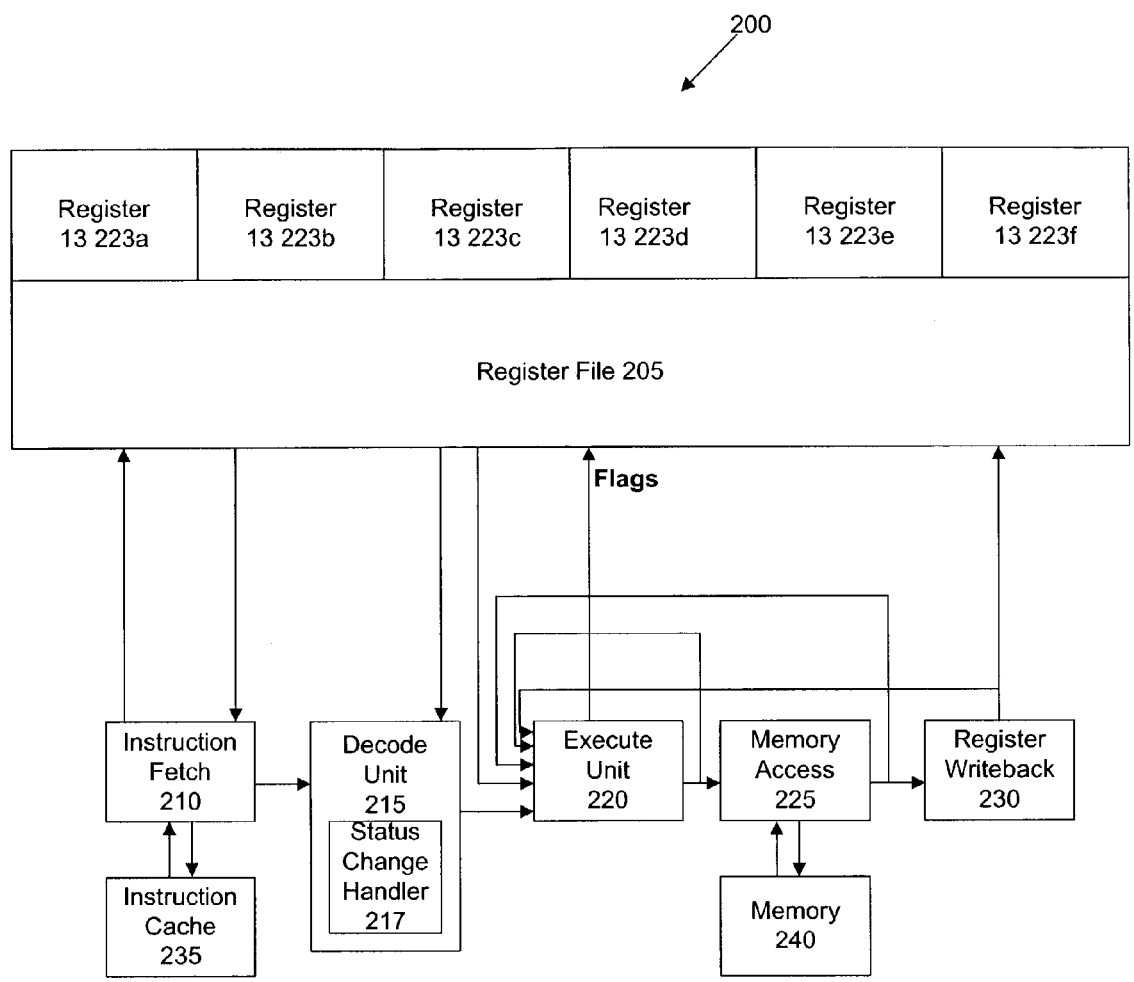
FIG. 2 is a diagram of a microprocessor implementing the Status Register Update Logic Optimization System according to principles of the present invention.

In FIG. 2, a Microprocessor 200 used in Status Register Update Logic Optimization according to principles of the present invention is shown. The Microprocessor 200 in FIG. 2 uses pipeline processing. As discussed earlier, pipeline processing enables the Microprocessor 200 to increase the speed at which it handles instructions.

In FIG. 2, an Instruction Fetch Unit 210 is communicatively connected to a Decode Unit 215 and an Instruction Cache Unit 235. The Decode Unit 215 is communicatively connected to an Execute Unit 220. The Execute Unit 220 is communicatively connected to a Memory Access Unit 225. The Memory Access Unit 225 is communicatively connected to a Register Writeback Unit 230. The Memory Access Unit 225 is also communicatively connected to a Memory 240. A Register File 205 is communicatively connected to the Instruction Fetch Unit 210, Decode Unit 215, Execute Unit 220 and the Register Writeback Unit 230.

FIG. 2 further illustrates a diagram of a multiple component Register 13 223a–223f within the Register File 205 of the Microprocessor 200 used in an exemplary embodiment of the present invention. The component of Register 13 that is accessed by the Decode Unit is controlled by the current status of the processor. A status instruction n is obtained by the Instruction Fetch Unit 210 at the conclusion of a clock cycle. At the next clock cycle, status instruction n moves to the Decode Unit 215 and instruction n+1 is located at the Instruction Fetch Unit 210.

The Decode Unit 215 of the present invention is capable of eliminating errors associated with status instructions. Status instruction n may change the status of the system when executed in the Execute Unit 220.

Register 13 223a–223f may comprise six components as shown in the Register File 205 of the Microprocessor 200. An instruction reads from and/or writes to Register 13 223a–223f based on the current status. Depending on the status of the system, e.g. an interrupt status, a fast interrupt status, abort status, or undefined instruction status, instructions will read from and/or write to different components of the Register 13 223a–223f. The Decode Unit 215 may read information from one of the six components of Register 13 223a–223f. The component of the Register 13 223a–223f that is read from is based on the current status of the processor. Therefore, when status instruction n is executed, it changes the status of the system, thereby changing which of the register components is read by the Decode Unit 215.

A problem occurs when the next instruction in the pipeline depends upon a result generated by a previous status instruction. The status of the system is being changed by the execution of the status instruction n in the Execute Unit 220, simultaneously with the Decode Unit 215 reading a register component whose selection is dependent upon the system status for instruction n+1. For example, when status instruction n enters the Execute Unit 220, the system may be at Status A. The status instruction n will change the system to Status B. However, the Decode Unit 215 is reading Register 13 for instruction n+1. As the system is currently at Status A the Decode Unit 215 will read the data from Register 13 component A 223a. However, when instruction n+1 moves into the Execute Unit 220 the system has changed to Status B. Instruction n+1 should be using the data from Register 13 component B 223b but has the data from Register 13 component A. Therefore, if a result based on Register 13 component A is used, incorrect data will be generated by instruction n+1.

Therefore, in an exemplary embodiment of the present invention, the Decode Unit 215 is configured with a status change handler 217 to recognize status instructions that cause a status change. Upon detection of a status instruction, the Decode Unit 215 will allow the status instruction to execute and then cause the system to wait a sufficient number of clock cycles to allow the status change to propagate through the pipeline. The instructions may then proceed, and the result that is requested by the dependent instruction will be correct. The implementation of these sufficient number of clock cycles in the Decode Unit 215 may require less hardware than a data forwarding solution. These sufficient number of clock cycles have a minimal impact on system performance, since this type of status instruction occurs infrequently in normal operation.

Figure 3:
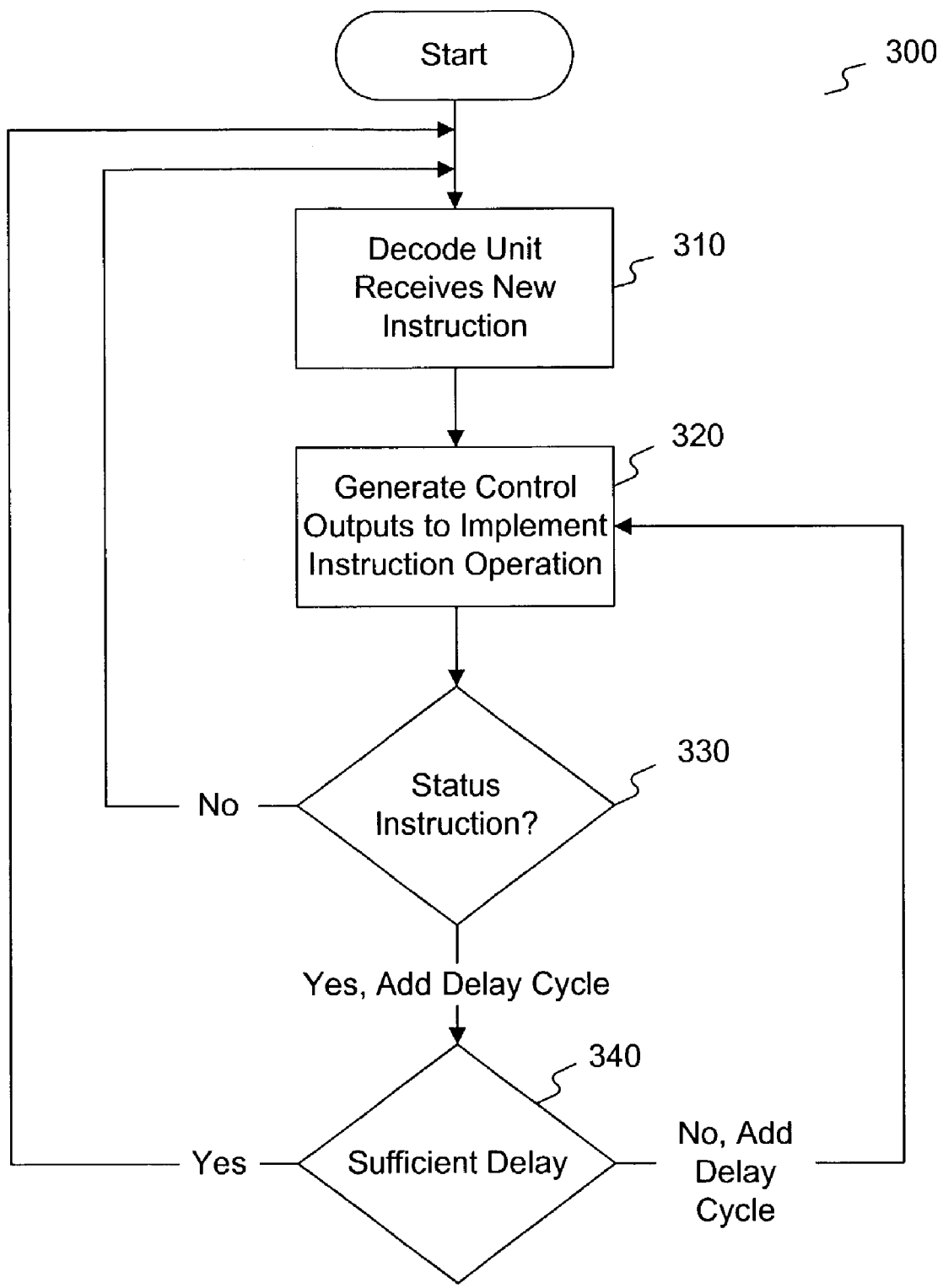
FIG. 3 is a flow diagram of the process followed in implementing the Status Register Update Logic Optimization System according to principles of the present invention.

FIG. 3 is a flow diagram of the process followed in implementing Status Register Update Logic Optimization. At stage 310, the Decode Unit 215 receives an instruction. At stage 320 the Decode Unit 215 generates the control outputs to implement the current instruction. At stage 330 the Decode Unit 215 determines if the current instruction is a status instruction. If it is not a status instruction, the next instruction is obtained and processed by going back to stage 310. If it is a status instruction, flow proceeds to stage 340 to check the delay time. At stage 340 the amount of delay for the current status change instruction is examined to determine if sufficient time has transpired to allow the status change to propagate through the pipeline. If sufficient time has transpired, the next instruction is obtained and processed by going back to stage 310. If insufficient time has transpired, flow goes to stage 320 to continue processing the current instruction. Stage 320 will generate outputs to implement an idle instruction for the delay cycles at the end of the status change instructions. The system 300 changes during decode delay cycles.

Figure 4:
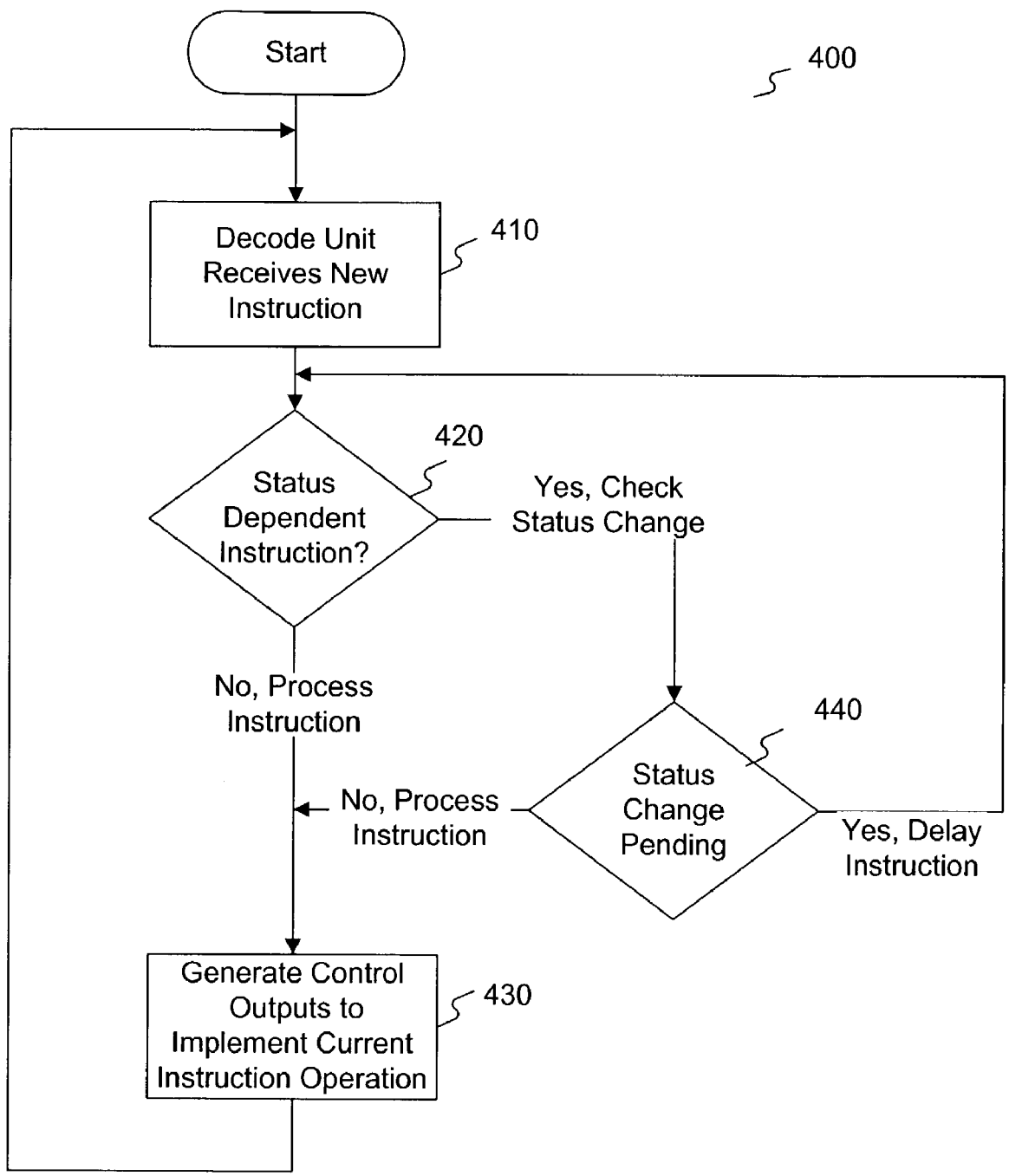
FIG. 4. is a flow diagram of an alternative process followed in implementing Status Register Update Logic Optimization.

FIG. 4. is a flow diagram of an alternative process followed in implementing Status Register Update Logic Optimization. At stage 410 an instruction is received by the Decode Unit 215. At stage 420 the Decode Unit 215 determines if the current instruction is dependent on status information. If it is not status dependent flow goes to stage 430 to generate the control outputs to implement the current instructin. If the current instruction is status dependent flow goes to stage 440 to determine if a status change is pending. At stage 440 the actions of preceding instructions are examined to determine if a status change was performed and has not been effected as yet. If a status change is not pending, flow goes to stage 430 to process the current instruction. If a status change is pending, the instruction is delayed and the flow goes to stage 420 to repeat processing of the current instruction. When sufficient time has transpired to allow the status change to become effective, the current status dependent instruction is passed to stage 430 for execution. The system 400 changes during decode delay cycles. Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A system for optimizing pipeline microprocessor logic for status register updates, comprising:
    a storage unit for storing instructions;
    a register file;
    a fetch unit, forming a portion of a processing pipeline, for fetching a status instruction and then fetching a next instruction from said storage unit and communicating with said register file; and
    a decode unit, coupled to said fetch unit and forming another portion of said processing pipeline, for decoding said status instruction from said fetch unit, and subsequently decoding said next instruction from said fetch unit, wherein said decoding of said next instruction depends upon a system status, and wherein upon detection of said status instruction by a status change handler within said decode unit, said decode unit causes said system to wait obtaining said next instruction for decoding by assigning a number of clock cycles to said next instruction to allow a status change generated by executing said status instruction to propagate through said processing pipeline.

2. The system as described in claim 1, wherein said decode unit determines if said status instruction changes said system status.

3. The system as described in claim 2, wherein an execute unit sends signals to change said system status, based on said status instruction.

4. The system as described in claim 1, wherein said register file contains status dependent registers.

5. A method of optimizing pipeline microprocessor logic for status register updates, comprising:
    fetching a status instruction and a next instruction at a fetch unit, wherein
        said fetch unit forms a portion of a processing pipeline;
        receiving said status instruction and said next instruction at a decode unit,
        wherein said decode unit is coupled to said fetch unit and forms another portion of said processing pipeline; and
    decoding said status instruction from said fetch unit, and subsequently decoding said next instruction from said fetch unit, wherein said decoding of said next instruction depends upon a system status, and wherein upon detection of said status instruction by a status change handler within said decode unit, said decode unit causes said system to wait obtaining said next instruction for decoding by assigning a number of clock cycles to said next instruction to allow a status change generated by executing said status instruction to propagate through said processing pipeline.

6. The method as described in claim 5, further comprising identifying said status instruction.

7. The method as described in claim 5, further comprising determining the number of clock cycles to allow said status change to propagate through said processing pipeline.

8. The method as described in claim 5, further comprising sending signals to change said system status, based on said status instruction.

9. The method as described in claim 5, further comprising signaling a system to wait a start of new operations while completing current operations.

10. The method as described in claim 5, further comprising advancing said status instruction to other units in said processing pipeline.

* * * * *